United States Patent [19]

Matsubayashi et al.

[11] Patent Number: 4,607,359
[45] Date of Patent: Aug. 19, 1986

[54] OPTICAL RECORDING/REPRODUCING APPARATUS

[75] Inventors: Nobuhide Matsubayashi; Kiichi Kato; Masaharu Sakamoto, all of Tokyo, Japan

[73] Assignee: Olympus Optical Co., Ltd., Tokyo, Japan

[21] Appl. No.: 575,045

[22] Filed: Jan. 30, 1984

[30] Foreign Application Priority Data

Feb. 10, 1983 [JP] Japan .................... 58-21307

[51] Int. Cl.⁴ .................................. G11B 7/08
[52] U.S. Cl. ......................... 369/46; 369/110; 369/121
[58] Field of Search ........... 369/44, 45, 46, 110, 369/121, 122; 250/201

[56] References Cited

U.S. PATENT DOCUMENTS 3,876,842  4/1975  Bouwhuis.
4,423,495  12/1983  Musha et al. ............... 369/45
4,425,636  1/1984  Musha et al. ............... 369/44
4,453,239  6/1984  Musha et al. ............... 369/45

FOREIGN PATENT DOCUMENTS 3227654  7/1982  Fed. Rep. of Germany.

Primary Examiner—Donald McElheny, Jr.
Attorney, Agent, or Firm—Frishauf, Holtz, Goodman & Woodward

[57] ABSTRACT

An optical recording/reproducing apparatus has a beam emitting device adapted to emit at least two light beams in directions at a minute angle to each other. The light beams are condensed by a condensing member onto slightly separated two points on a disk and reflected by the disk. The light beams from the disk are polarized to a prism by a polarizing device. The prism refracts the light beams from the polarizing device, thereby increasing the relative angle between the light beams. The refracted light beams are converged by a converging lens on a detector.

9 Claims, 14 Drawing Figures

OPTICAL RECORDING/REPRODUCING APPARATUS

BACKGROUND OF THE INVENTION

The present invention relates to an optical recording-/reproducing apparatus for optically recording information on a recording medium and reproducing the recorded information.

Figure 1:
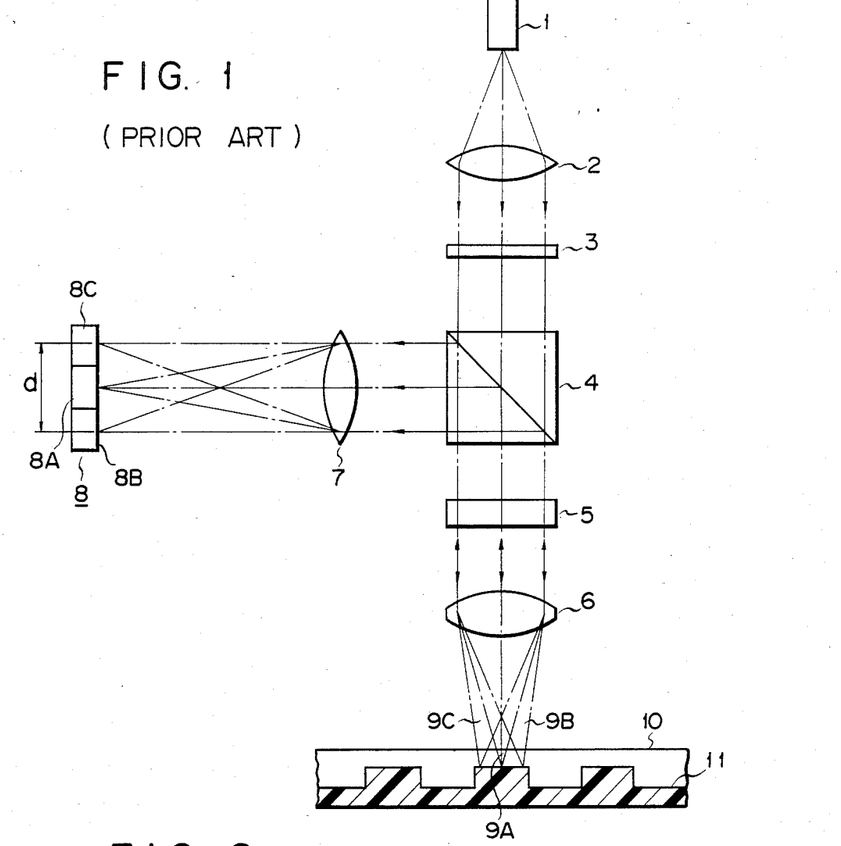
FIG. 1 is a schematic view showing an optical system of a prior art optical recording/reproducing apparatus.

In conventional optical recording/reproducing apparatuses which record and reproduce information by using laser beams, tracking control is achieved by forming two or more beam spots on a recording medium and leading reflected light beams from the beam spots to a detector, whereby the difference in quantity between the reflected light beams is detected. FIG. 1 shows an optical system of one such conventional optical recording/reproducing apparatus. Referring to FIG. 1, there are shown a laser source 1, a collimator lens 2, a diffraction grating 3, a polarized beam splitter 4, a quarter wavelength plate 5, an objective lens 6, a converging lens 7, and a detector 8 divided in three. A light beam emitted from the laser source 1 is converted into a parallel light beam by the collimator lens 2, and then projected on the diffraction grating 3. The light beam incident on the diffraction grating 3 is split into a main beam 9A traveling along the optical axis of the optical system, and at least two auxiliary beams 9B and 9C directed at a certain angle to the optical axis, which are individually projected on the polarized beam splitter 4. The main beam 9A and the auxiliary beams 9B and 9C incident on the beam splitter 4 are projected with P-polarization, and transmitted through the beam splitter 4 to be led to the quarter wavelength plate 5. Thereafter, the main beam 9A and the auxiliary beams 9B and 9C are projected on the objective lens 6, and converged thereby on an information track 11 of a disk 10 as a recording medium.

The main beam 9A and the auxiliary beams 9B and 9C are reflected by the disk surface, and projected again on the beam splitter 4 via the objective lens 6 and the quarter wavelength plate 5. Since the main beam 9A and the auxiliary beams 9B and 9C are subject to S-polarization as they reciprocate once through the quarter wavelength plate 5, they are reflected by the beam splitter 4 to be led to the converging lens 7. Then, the beams 9A, 9B and 9C are converged on light receiving surfaces 8A, 8B and 8C of the detector 8 by the converging lens 7. Record information on the disk 10 is chiefly obtained from the main beam 9A converged on the light receiving surface 8A, while tracking information is obtained from the auxiliary beams 9B and 9C converged on the light receiving surfaces 8B and 8C.

Figure 2:
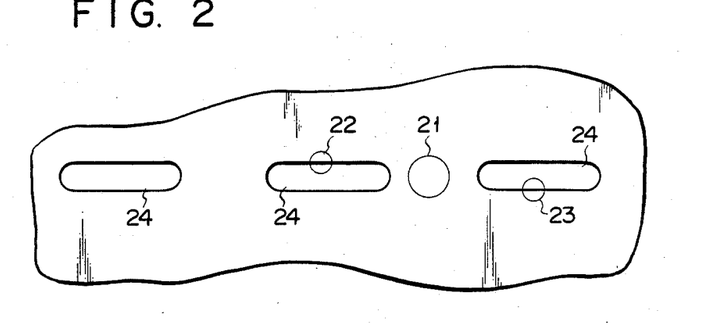
FIG. 2 is a schematic view showing spots of beams converged on a recording medium.

FIG. 2 is a plan view showing spots of the main and auxiliary beams converged on the disk. In FIG. 2, numeral 21 designates the spot of the main beam 9A, and numerals 22 and 23 denote those of the auxiliary beams 9B and 9C, respectively. If the laser beams converged on the disk 10 are free from any tracking errors, the main beam 9A is on the center line of pits 24, and the auxiliary beams 9B and 9C are on the edges of their corresponding pits 24. Thus, the quantities of reflected light from the spots 22 and 23 are equal. If the laser beams are subject to tracking errors, then the main beam 9A is off the center line of the pits 24, and the auxiliary beams 9B and 9C are off the edges of the pits 24. Thus, the quantities of reflected light are unequal. Accordingly, the tracking information can be obtained by detecting the difference between the quantities of reflected light derived from the auxiliary beams 9B and 9C by means of the light receiving surfaces 8B and 8C of the detector 8.

Thus, in order to obtain the tracking information, the differently angled auxiliary beams 9B and 9C must be independently converged on the light-receiving surfaces 8B and 8C of the detector 8. To attain this, it is necessary that the distance between the converging points of the auxiliary beams 9B and 9C be long enough to match the size of the detector 8.

In the prior art optical recording/reproducing apparatus, however, it is necessary to increase the focal distance of the converging lens 7 if the relative angle between the auxiliary beams 9B and 9C is minute. In consequence, the optical paths are extended to prevent the miniaturization of the optical system. Hereupon, if the slit width of the diffraction grating 3 and the wavelength of the laser source 1 are D and λ, respectively, the relative angle $\theta$ between the auxiliary beams 9B and 9C are given by $$\theta = \sin^{-1}(\lambda/D). \tag{1}$$

Also, if the distance between the light-receiving surfaces 8B and 8C of the detector 8 is d (constant), and if the focal distance of the converging lens 7 is f, then we obtain the following relation.

$$d = f \cdot \theta. \tag{2}$$

Therefore, if the relative angle $\theta$ between the auxiliary beams 9B and 9C is minute, it is evident from eq. (2) that the focal distance f of the converging lens 7 needs to be increased in order that the beams may be received by the light-receiving surfaces 8B and 8C. This requirement constitutes a serious hindrance to the miniaturization of the optical system.

SUMMARY OF THE INVENTION

The present invention is contrived in consideration of these circumstances, and is intended to provide an optical recording/reproducing apparatus affording a good distance between the converging points of beams converged on a detector and miniaturization of the optical system.

According to an aspect of the invention, there is provided an optical recording/reproducing apparatus which comprises a refractive member disposed between a beam splitter and a converging lens and adapted to refract light beams from the beam splitter, thereby increasing the relative angle between the light beams. The refractive member has an incidence surface on which the light beams from the beam splitter are projected and an emitting surface facing the incidence surface at a given angle thereto. The light beams transmitted through the refractive member are projected on the emitting surface of the refractive member at an angle of incidence a little narrower than the critical angle.

The distance between the spots of the light beams converged on the detector by the converging member can be widened by increasing the relative angle between the light beams by means of the refractive member. According to the present invention, therefore, the distance between the spots of the light beams on the detector can be made long enough without extending the focal distance of the converging member. This permits miniaturization of the optical system.

BRIEF DESCRIPTION OF THE DRAWINGS

FIGS. 4 to 9 show characteristics of a refractive member used in the optical system of the optical recording/reproducing apparatus according to the one embodiment of the invention, in which

DETAILED DESCRIPTION OF THE PREFERRED EMBODIMENT

One embodiment of the present invention will now be described in detail with reference to the accompanying drawings.

Figure 3:
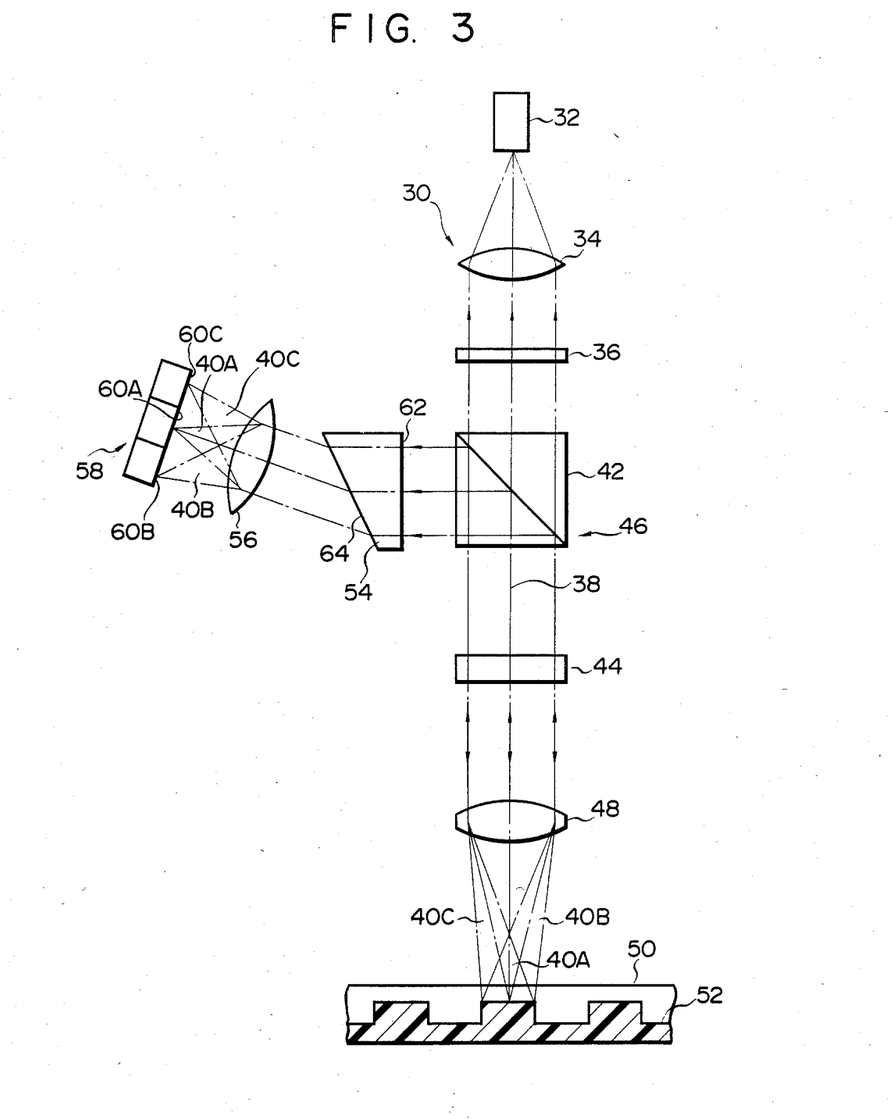
FIG. 3 is a schematic view showing an optical system of an optical recording/reproducing apparatus according to one embodiment of the present invention.

As shown in FIG. 3, an optical system of an optical recording/reproducing apparatus according to the one embodiment of the invention is provided with beam emitting means 30, which includes a laser source 32, a collimator lens 34 for converting light beam emitted from the laser source 32 into parallel light beam and a diffraction grating 36 for splitting the parallel light beam into a plurality of, e.g., three, light beams. The parallel light beam incident on the diffraction grating 36 is split thereby into a main beam 40A for information recording and reproduction which travels along the optical axis 38 of the optical system and two auxiliary beams 40B and 40C for tracking control which are directed at a minute angle to the optical axis. The main and auxiliary beams 40A, 40B and 40C are led to directing means 46 which includes a beam splitter 42 and a quarter wavelength plate 44. Then, the main beam 40A and the auxiliary beams 40B and 40C are projected on an objective lens 48 and converged thereby on an information track 52 of a disk 50 as a recording medium.

The main beam 40A and the auxiliary beams 40B and 40C converged on the disk 50 are reflected by the disk surface, and are transmitted again to the beam splitter 42 via the objective lens 48 and the quarter wavelength plate 44. The polarization faces of the beams are turned 90° as they reciprocate once through the quarter wavelength plate 44, so that the beams are reflected by the beam splitter 42 to be incident on a rectangular prism 54 as a refractive member. The rectangular prism 54 refracts the individual beams to increase the relative angle between the auxiliary beams 40B and 40C. The main beam 40A and the auxiliary beams 40B and 40C emitted from the prism 54 are led to a converging lens 56 to be converted thereby on the light-receiving surfaces 60A, 60B and 60C of a detector 58. Record information on the disk 50 is chiefly detected from the main beam 40A converged on the light-receiving surface 60A, while tracking information is detected from the auxiliary beams 40B and 40C converged on the light-receiving surfaces 60B and 60C, respectively.

The prism 54 will now be described in detail.

Figure 4:
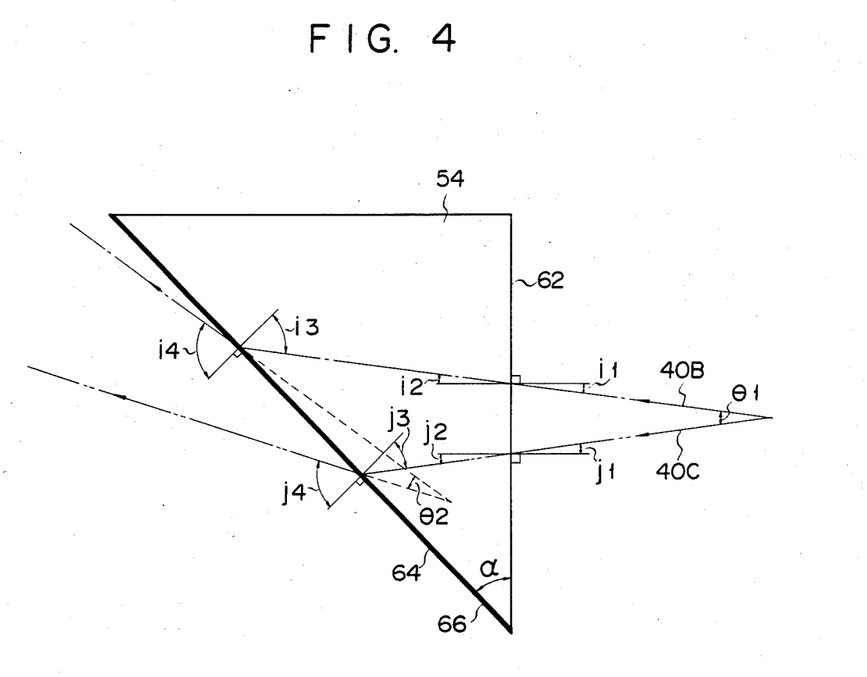
FIG. 4 illustrates optical paths.

As shown in FIG. 4, the prism 54 has an incidence surface 62 on which the beams from the beam splitter 42 are projected and an emitting surface 64 facing the incidence surface 62 at an angle $\alpha$ thereto. The prism 54 is disposed so that the incidence surface 62 is located at right angles to the optical axis of the optical system. FIG. 4 shows optical paths along which the auxiliary beams 40B and 40C directed at minute angles to the optical axis of the optical system are transmitted through the prism 54. Suppose that the angles of incidence at which the auxiliary beams 40B and 40C are projected on the incidence surface 62 are i1 and j1, respectively, that the angles of emergence are i2 and j2, that the refractive index of air is 1.0, and that the refractive index of the prism 54 is n (n≧1.0). Thereupon, we obtain the following relations.

$$1.0 \times \sin i1 = n \times \sin i2, \tag{3}$$

$$1.0 \times \sin j1 = n \times \sin j2. \tag{4}$$

Also suppose that the angles of incidence at which the auxiliary beams 40B and 40C transmitted through the prism 54 are projected on the emitting surface 64 are i3 and j3, respectively, and that the angles of emergence at which the auxiliary beams 40B and 40C are transmitted through the emitting surface 64 and i4 and j4, respectively. Thereupon, we obtain the following relations.

$$1.0 \times \sin i4 = n \times \sin i3, \tag{5}$$

$$1.0 \times \sin j4 = n \times \sin j3. \tag{6}$$

If both the angles of incidence i1 and j1 are narrow, and if we have sin i1=i1 and sin j1=j1, then we may obtain from eqs. (3) and (4)

$$i1 = n \cdot \sin i2, \tag{7}$$

$$j1 = n \cdot \sin j2, \tag{8}$$

As for the angles of incidence i3 and j3, they may be given by:

$$i3 = \alpha - i2, \tag{9}$$

$$j3 = \alpha - j2. \tag{10}$$

Since the transmission of the auxiliary beams 40B and 40C through the emitting surface 64 requires the angles of incidence i3 and j3 to be narrower than the critical angle $\theta C = \sin^{-1}(1/n)$, the angles of emergence i4 and j4 may be expressed as follows:

$$i4 = \sin^{-1}\{n \cdot \sin(\alpha - i1/n)\}, \quad (11)$$

$$j4 = \sin^{-1}\{n \cdot \sin(\alpha - j1/n)\}. \quad (12)$$

If the relative angle between the auxiliary beams 40B and 40C incident on the prism 54 is $\theta 1 = 0.8°$, and if the refractive index and vertical angle of the prism 54 are $n = 1.51$ and $\alpha = 41.0°$, respectively, then the angles of incidence i1 and j1 of the auxiliary beams 40B and 40C on the prism 54 are $i1 = 0.4°$ and $j1 = -0.4°$, and the angles of emergence i4 and j4 of the auxiliary beams 40B and 40C transmitted through the prism 54, based on eqs. (11) and (12), are given by $$i4 = 80.19° \quad (13)$$

$$j4 = 84.42° \quad (14)$$

Accordingly, the relative angle $\theta 2$ between the auxiliary beams 40B and 40C transmitted through the prism 54 is:

$$\theta 2 = j4 - i4 = 4.63°. \quad (15)$$

This angle $\theta 2$ is about 5.8 times as wide as the relative angle $\theta 1$ for the beams before incidence. If the values $\theta 1$ and $\theta 2$ are applied to eq. (2), supposing that the distance d between the beam spots of the auxiliary beams 40B and 40C on the light-receiving surfaces 60B and 60C of the detector 58 is fixed, then the focal distance f is found to be reduced to 1/5.8. Thus, miniaturization of the optical system is permitted.

Figure 5:
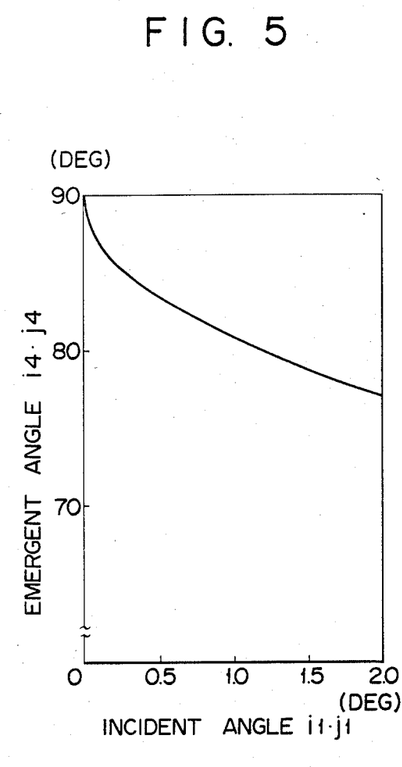
FIG. 5 shows an angle of incidence-angle of emergence characteristic curve.
Figure 6:
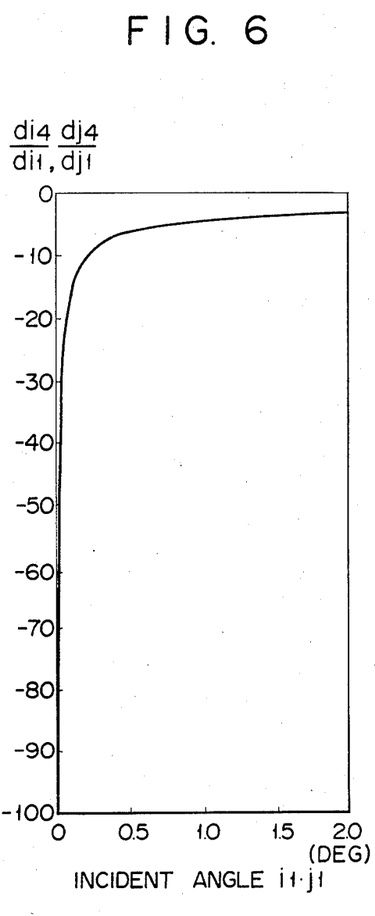
FIG. 6 shows a curve illustrating the rate of change of the angle of emergence to the angle of incidence.

The vertical angle $\alpha$ of the prism 54, i.e., the angle formed by the incidence surface 62 and the emitting surface 64, is a little narrower than the critical angle $\theta C$. FIG. 5 shows an angle of incidence-angle of emergence characteristic curve of the prism 54, while FIG. 6 shows the rate of change of the angle of emergence to the angle of incidence ranging from 0° to 2°. As shown in FIG. 5, as the angles of incidence i1 and j1 of the auxiliary beams 40B and 40C incident on the prism 54 are reduced, the angles of emergence i4 and j4 are increased in proportion. As seen from FIG. 6, moreover, the gradient (di4/di1) becomes sharper as the angles of incidence i1 and j1 approach 0°. In other words, the angles of emergence i4 and j4 can be widened by approximating the angles of incidence i1 and j1 to 0°. Thus, the relative angle $\theta 2$ between the auxiliary beams 40B and 40C obtained at the time of emission may be made wider than the relative angle $\theta 1$ obtained at the time of incidence.

Figure 7:
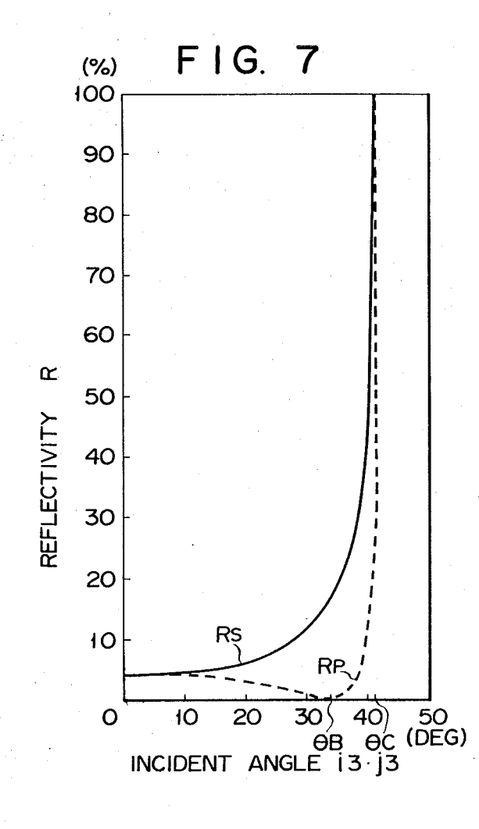
FIG. 7 shows angle of incidence-reflectivity characteristic curves.
Figure 8:
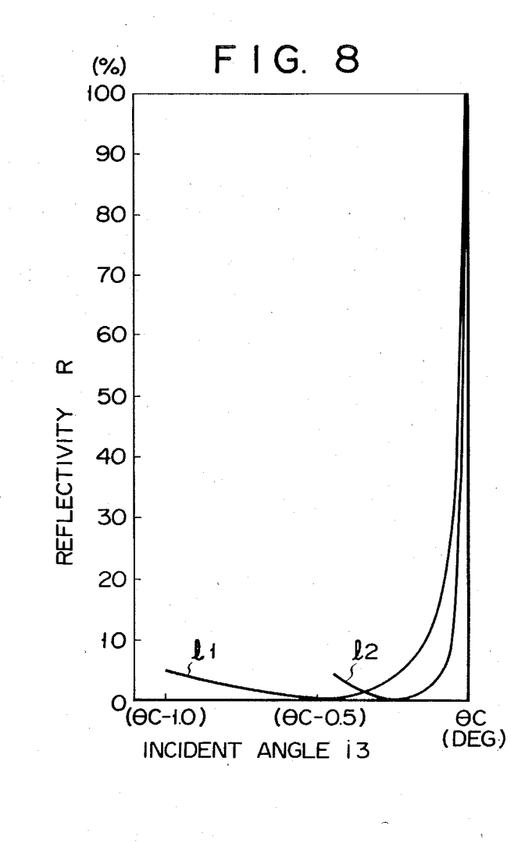
FIG. 8 shows angle of incidence-reflectivity characteristic curves obtained with use of a refractive member with a dielectric interference film on its emitting surface.

As shown in FIG. 7, the reflectivity R for the emitting surface 64 of the prism 54 suddenly increases as the angles of incidence i3 and j3 of the auxiliary beams 40B and 40C approach the critical angle $\theta C$ beyond the blue-star angle $\theta B$ (angle of incidence for zero reflectivity). Loss of beam intensity is increased especially in the case of S-polarization, as indicated by curve $R_S$. Therefore, in order to increase the relative angle $\theta 2$ between the auxiliary beams 40B and 40C emitted from the prism 54 and to reduce the beam intensity loss, according to the present embodiment, a dielectric interference film 66 for reducing the reflectivity R is formed on the emitting surface 64 of the prism 54. The dielectric interference film 66 is formed of alternate lamination layers of a high-refraction medium with a refractive index $n1 = 2.2$, e.g., $TiO_2$, and a low-refraction medium with a refractive index $n2 = 1.46$, e.g., $SiO_2$. FIG. 8 shows angle of incidence-reflectivity characteristic curves of the prism 54 for the case where the dielectric interference film 66 is formed on the emitting surface 64. In FIG. 8, curves 11 and 12 represent characteristics obtained in the cases where the dielectric interference film 66 is five-layered and seven-layered, respectively. As seen from FIG. 8, the substantial blue-star angle on the emitting surface 64 for zero reflectivity can be approximated to the critical angle by forming the dielectric interference film 66 on the emitting surface 64. Therefore, the auxiliary beams 40B and 40C can be transmitted through the prism 54 without being reflected by the emitting surface 64, even though they are projected on the prism 54 at narrower angles of incidence i1 and j1 than those for the case where the dielectric interference film 66 is not formed on the emitting surface 64. Thus, the relative angle $\theta 2$ between the auxiliary beams 40B and 40C can be further increased, and the beam intensity loss can be prevented. If the beam incident on the prism 54 is a P-polarized beam, the dielectric interference film 66 is formed in a manner such that the high-refraction medium is in contact with the emitting surface 64. If the incident beam is a S-polarized beam, the dielectric interference film 66 is formed so that the low-refraction medium is in contact with the emitting surface 64.

According to the present embodiment, as described above, the prism 54 is disposed between the polarized beam splitter 42 and the converging lens 56 so that the relative angle between the auxiliary beams 40B and 40C is increased by the prism 54. Accordingly, the distance between the spots of the auxiliary beams 40B and 40C converged on the detector 58 by the converging lens 56 can be widened. As a result, the distance between the auxiliary beam spots on the detector 58 can be made long enough without extending the focal distance of the converging lens 56. This permits miniaturization of the optical system.

An additional effect of the present embodiment lies in that an image on the detector 8 can be increased in magnification, as compared with an image on the disk surface. Suppose that the diameters of the auxiliary beam 40C before incidence, in the prism 54, and after emission are a, b and c, respectively, and that the focal distances of the objective lens 48 and the converging lens 56 are f1 and f2, respectively, in the case where the vertical angle $\alpha$ of the prism 54 and the angle of incidence i1 are $\alpha = 41.0°$ and $i1 = 0.4°$, respectively. Thereupon, we may obtain the following relation.

$$\frac{f_2}{f_1} \cdot \frac{a}{b} \cdot \frac{b}{c} = \frac{f_2 a}{f_1 c}. \quad (16)$$

If the angle of incidence i1 is so narrow that we may substantially have $\cos i1 = \cos i2 = 1$, the beam diameters a and b are equal since we have $a/\cos i1 = b/\cos i2$. Accordingly, the beam diameter C may be given by:

$$C = (\cos i4/\cos i1)a, \quad (17)$$

so that the ratio between the diameters of the emitted beam and the incident beam, i.e., magnification, is $$a/c = \cos i1/\cos(\sin^{-1}\{n \cdot \sin(\alpha - i1/n)\}). \quad (18)$$

Figure 9:
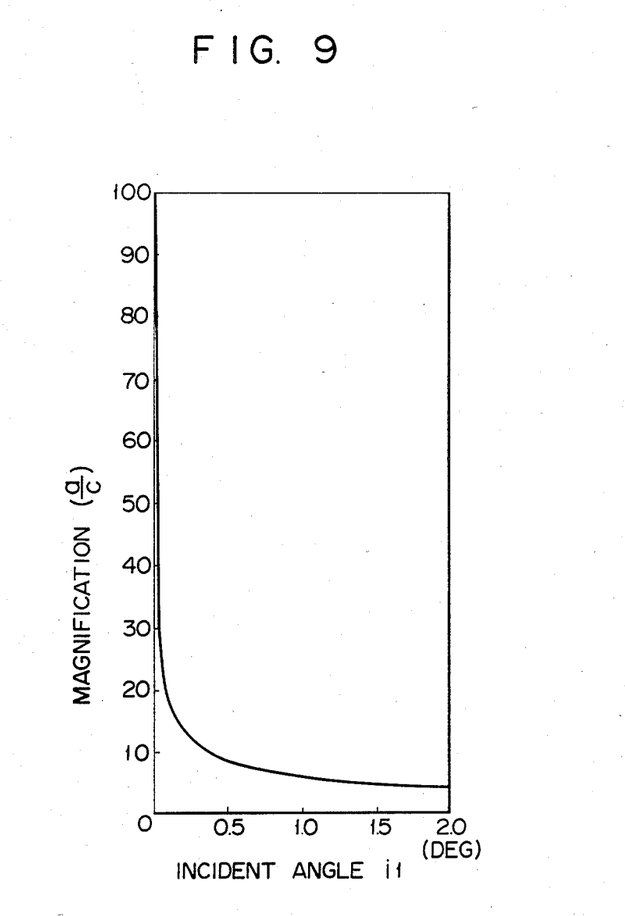
FIG. 9 shows a curve illustrating the relationship between the angle of incidence and the ratio between diameters of a beam before incidence on the refractive member and after transmission through the refractive member.

FIG. 9 shows the relationship between the angle of incidence and the magnification obtained in the case where the vertical angle $\alpha$ is used as the critical angle. As seen from FIG. 9, the narrower the angle of incidence i1, the greater is the magnification of the auxiliary beams 40B and 40C.

The present invention is not limited to the embodiment shown in FIG. 3. Various modifications may be made within the scope of the invention.

Figure 10:
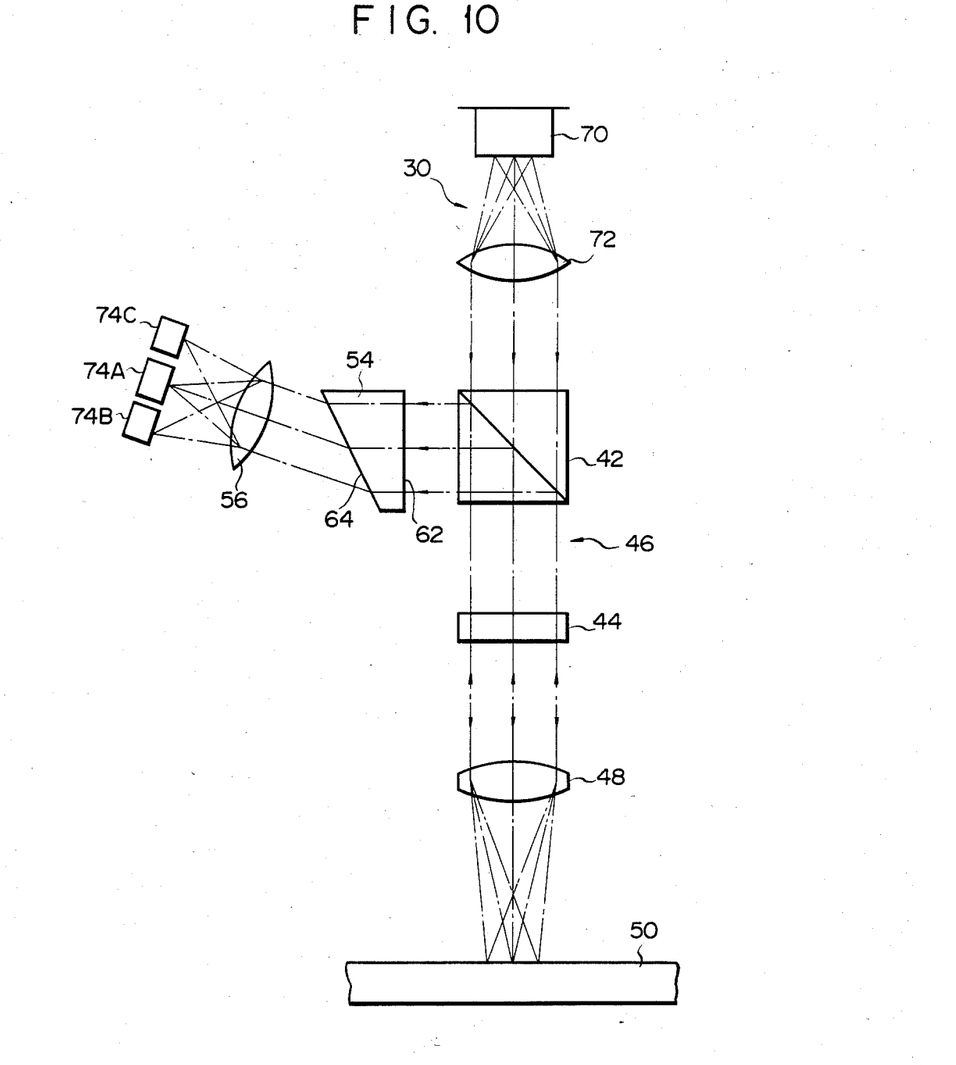
FIG. 10 is a schematic view showing an optical system of an optical recording/reproducing apparatus according to a second embodiment.
Figure 11:
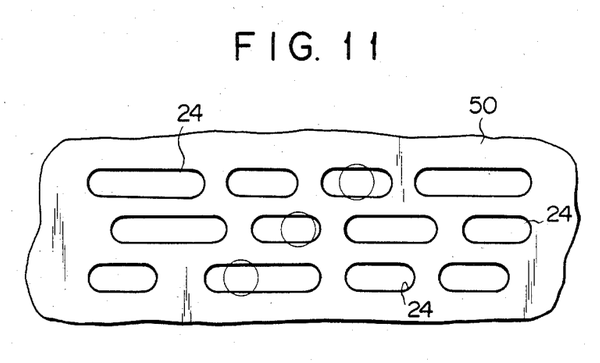
FIG. 11 is a schematic view showing spots of beams converged on a recording medium.

For example, the invention may be applied to such a multi-beam optical apparatus as shown in FIG. 10. This embodiment has a beam emitting means 30 with a laser device 70 and a collimator lens 72. The device 70 has three laser emitting points which are aligned in a line and emit light beams for information recording or information recording/reproducing in directions at slightly different angles. The light beams from these points pass through directing means 46. They are focused by an objective lens 48 onto the three tracks of a disk 50 as shown in FIG. 11. They are reflected from the disk 50, pass through the lens 48, means 46, a prism 54 and a converging lens 56, and are converged onto detectors 74A, 74B and 74C, respectively.

Figure 12:
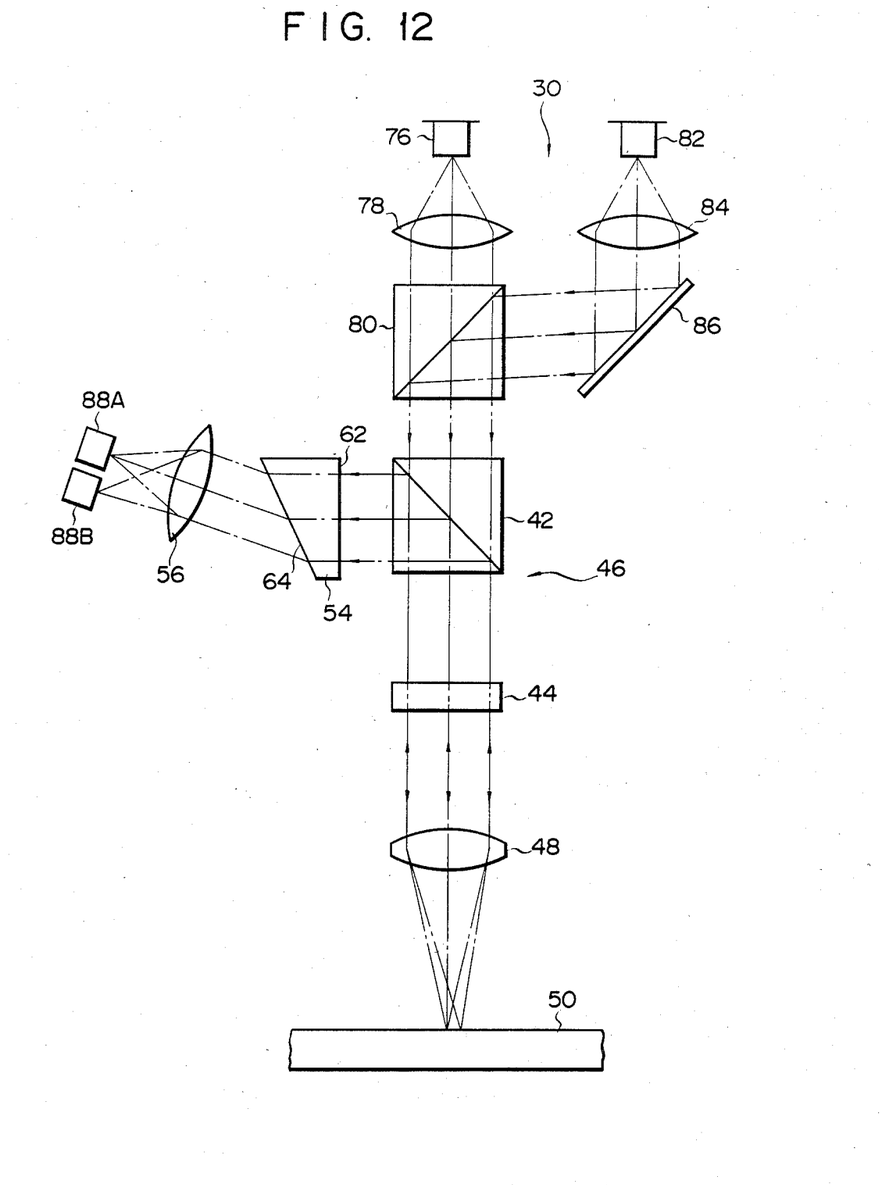
FIG. 12 is a schematic view showing an optical system of an optical recording/reproducing apparatus according to a third embodiment.
Figure 13:
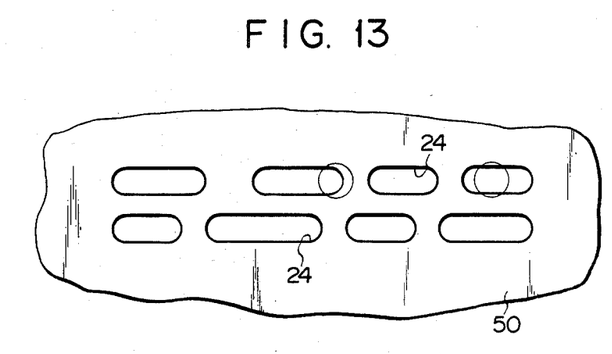
FIGS. 13 and 14 are schematic views showing spots of beams converged on a recording medium.
Figure 14:
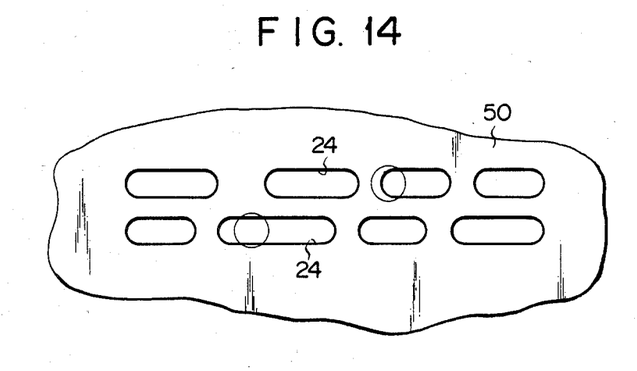

Moreover, the present invention may be applied to such a two-beam optical apparatus as shown in FIG. 12. This embodiment has a beam emitting means 30 with a first laser 76, a collimator lens 78, a half mirror 80, a second laser 82, a collimator lens 84 and a mirror 86. The means 30 emits two light beams at slightly different angles. These light beams pass through directing means 46. They are focused by an objective lens 48 onto the same track of a disk 50 as shown in FIG. 13 or onto two adjacent tracks of the disk 50 as shown in FIG. 14. They are reflected from the disk 50, pass through the lens 48, means 46, a prism 54 and a converging lens 56, and are focused onto detectors 88A and 88B, respectively.

The embodiments shown in FIGS. 10 and 12 can provide the same effects as does the embodiment of FIG. 3.

What is claimed is:

1. An optical recording/reproducing apparatus for recording informaton on a recording medium and reproducing the recorded information, comprising:
    an optical system including:
        beam emitting means for emitting at least two light beams in directions at a minute angle to each other;
        a condensing member for condensing the light beams onto slightly separated two points on the recording medium;
        directing means for directing the light beams reflected by the recording medium in predetermined directions;
        a converging member for converging the light beams from the directing means;
        detecting means for detecting the light beams converged by the converging member; and
        a refractive member disposed between the directing means and the converging member for refracting the light beams from the directing means, thereby increasing the relative angle between the light beams, the refractive member having an incidence surface on which the light beams from the directing means are projected and an emitting surface facing the incidence surface at a given angle thereto, so that the light beams transmitted through the refractive member are projected on the emitting surface at an angle of incidence a little narrower than the critical angle.

2. The apparatus according to claim 1, wherein said refractive member is disposed so that the incidence surface is located substantially at right angles to the optical axis of the optical system, and the angle formed by the incidence surface and the emitting surface is a little narrower than the critical angle.

3. The apparatus according to claim 2, wherein said refractive member includes a reflection preventing means formed on the emitting surface for preventing the light beams from reflecting from the emitting surface.

4. The apparatus according to claim 3, wherein said reflection preventing means comprises a dielectric interference film formed of alternate lamination layers of high- and low-refractive-index media.

5. The apparatus according to claim 1, wherein said beam emitting means includes:
    a laser source for emitting a light beam,
    a collimator lens for converting a light beam emitted from the laser source into a parallel light beam, and
    a splitting element for splitting the parallel light beam into a main beam for information recording and reproducing, and at least two auxiliary beams for tracking control, said main beam being directed along the optical axis of the optical system and said auxiliary beams being directed in directions at individual minute angles to the optical axis.

6. The apparatus according to claim 1, wherein said beam emitting means includes a laser device having at least two emitting points arranged in a line and adapted to emit at least two light beams for information recording and/or reproducing in directions at a minute angle to each other, and a collimator lens for converting the light beams emitted from the laser device into parallel light beams.

7. The apparatus according to claim 1, wherein said beam emitting means includes a first light beam emitting means for emitting a light beam along the axis of the optical system and a second light beam emitting means for emitting a light beam in a direction at a minute angle to the axis of the optical system.

8. The apparatus according to claim 7, wherein:
    said first light beam emitting means includes a first laser source for emitting a light beam, a first collimator lens for converting a light beam emitted from the first laser source into a parallel light beam, and a half mirror arranged between the first collimiator lens and the polarizing means and permitting the passage therethrough of the light beam emitted from the first laser source, and
    said second light beam emitting means includes a second laser source for emitting a light beam, a second collimator lens for converting a light beam emitted from the second laser source into a parallel light beam from the second collimator lens to the half mirror, the parallel light beam reflected by the mirror being reflected by the half mirror in a direction at a minute angle to the axis of the optical system.

9. An optical recording/reproducing apparatus for recording information on a recording medium and reproducing the recorded information, comprising;
    an optical system including:
        beam emitting means for emitting at least two light beams in directions at a minute angle to each other;
        a condensing member for condensing the light beams onto slightly separated two points on the recording medium;
        directing means for directing the light beams reflected by the recording medium in predetermined directions;

a converging member for converging the light beams from the directing means;

detecting means for detecting the light beams converged by the converging member; and a refractive member disposed between the directing means and the converging member for refracting the light beams from the directing means to increase the relative angle between the light beams, the refractive member having an incidence surface on which the light beams from the directing means are projected, an emitting surface facing the incidence surface at a given angle thereto and reflection preventing means formed on the emitting surface for preventing the light beams from reflecting from the emitting surface, so that the light beams transmitted through the refractive member are projected on the emitting surface at an angle of incidence a little narrower than the critical angle.

* * * * *